US009892011B2

(12) United States Patent
Viswanathan et al.

(10) Patent No.: US 9,892,011 B2
(45) Date of Patent: Feb. 13, 2018

(54) APPARATUS AND METHOD FOR AUTODETECTION OF HART DEVICES OVER PROFIBUS

(71) Applicant: Honeywell International Inc., Morris Plains, NJ (US)

(72) Inventors: Sethupathy Viswanathan, Bangalore (IN); Kranthi Kumar Paluvadi, Bangalore (IN); Ananda Huchappa Shastry, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 176 days.

(21) Appl. No.: 14/927,205

(22) Filed: Oct. 29, 2015

(65) Prior Publication Data

US 2017/0123952 A1    May 4, 2017

(51) Int. Cl.
| | | |
|---|---|---|
| G06F 11/30 | (2006.01) | |
| G06F 13/42 | (2006.01) | |
| G06F 13/40 | (2006.01) | |
| G06F 13/364 | (2006.01) | |

(52) U.S. Cl.
CPC ...... *G06F 11/3027* (2013.01); *G06F 11/3051* (2013.01); *G06F 13/364* (2013.01); *G06F 13/4022* (2013.01); *G06F 13/4282* (2013.01); *G05B 2219/25101* (2013.01); *G05B 2219/31104* (2013.01); *G05B 2219/31138* (2013.01)

(58) Field of Classification Search
CPC . G06F 2219/25101; G06F 2219/31104; G06F 2219/31138; G06F 11/3051
See application file for complete search history.

(56) References Cited

U.S. PATENT DOCUMENTS

| | | | | |
|---|---|---|---|---|
| 6,449,715 B1* | 9/2002 | Krivoshein | ........ | G05B 19/4185 700/1 |
| 8,849,429 B2* | 9/2014 | Ojha | .................... | G05B 19/042 700/17 |
| 2002/0147511 A1* | 10/2002 | Eryurek | ............... | G05B 23/027 700/80 |
| 2005/0123884 A1* | 6/2005 | Walls | ................... | G05B 19/042 434/118 |
| 2007/0280286 A1 | 12/2007 | Hodson et al. | | |
| 2008/0273486 A1* | 11/2008 | Pratt | .................... | H04L 12/403 370/328 |

(Continued)

OTHER PUBLICATIONS

Liu, Jingyu; Fang, Yanjun; and Zhang, Dahai; "PROFIBUS-DP and HART Protocol Conversion and the Gateway Development"; 2007 Second IEEE Conference on Industrial Electronics and Applications; IEEE; 2007.*

(Continued)

*Primary Examiner* — Glenn A Auve

(57) ABSTRACT

A master device is configured to perform a method that includes receiving highway addressable remote transducer (HART) device data of a HART slave device connected to PROFIBUS RIO Slave. The method also includes identifying a device description (DD) file associated with the HART slave device using the HART device data that is collected automatically based on the PROFIBUS slave Profile index before even configuring the HART device in the system. The method further includes performing one or more device communication functions with the HART slave device to collect the data automatically.

20 Claims, 3 Drawing Sheets

(56) References Cited

U.S. PATENT DOCUMENTS

| | | |
|---|---|---|
| 2009/0010203 A1 | 1/2009 | Pratt, Jr. et al. |
| 2009/0292996 A1* | 11/2009 | Anne ................ G05B 19/0428 715/736 |
| 2010/0083168 A1* | 4/2010 | Kanokogi ............. G06F 3/0481 715/802 |
| 2012/0230446 A1 | 9/2012 | Feng |
| 2013/0297842 A1 | 11/2013 | Liu |
| 2014/0269764 A1 | 9/2014 | Borgeson et al. |

OTHER PUBLICATIONS

"HART Over PROFIBUS Interface"; AMS Suite: Intelligent Device Manager Product Data Sheet; Emerson Process Management; 2013.*

"PROFIBUS DP Slave to HART Multi-drop Gateway" product data sheet; ProSoft Technology, Inc.; May 3, 2007.*

TACC HART Over PROFIBUS User Manual; Emerson Process Management; Dec. 2014.*

Notification of Transmittal of the International Search Report and the Written Opinion of the International Searching Authority dated Feb. 2, 2017, 15 pages.

\* cited by examiner

US 9,892,011 B2

APPARATUS AND METHOD FOR AUTODETECTION OF HART DEVICES OVER PROFIBUS

TECHNICAL FIELD

This disclosure is generally directed to detecting highway addressable remote transducer (HART) devices. More specifically, this disclosure is directed to an apparatus and method for detecting HART devices connected to a HART input-output module that is part of a Remote Input-Output PROFIBUS slave.

BACKGROUND

Industrial process control and automation systems are often used to automate large and complex industrial processes. Many industrial facilities include HART devices connected to a PROFIBUS Remote Input-Output HART module. In order to interpret data from a HART device, a host controller must understand the device capabilities from the device description (DD) file from the vendor.

SUMMARY

This disclosure relates to an apparatus and method for detecting HART devices connected to a HART input-output module that is part of a Remote Input-Output PROFIBUS slave and automatically configuring it in the host system.

In a first embodiment, a method is provided. The method includes receiving highway addressable remote transducer (HART) device data of a HART slave device. The method also includes identifying a device description (DD) file associated with the HART slave device using the HART device data. The method further includes performing one or more device communication functions with the HART slave device.

In a second embodiment, a master device including processing circuitry is provided. The processing circuitry is configured to receive HART device data of a HART slave device. The processing circuitry is also configured to identify a DD file associated with the HART slave device using the HART device data. The processing circuitry is further configured to perform one or more device communication functions with the HART slave device.

In a third embodiment, a non-transitory, computer-readable medium storing one or more executable instructions is provided. The one or more executable instructions, when executed by one or more processors, cause the one or more processors to receive HART device data of a HART slave device. The one or more executable instructions, when executed by the one or more processors, also cause the one or more processors to identify a DD file associated with the HART slave device using the HART device data. The one or more executable instructions, when executed by the one or more processors, further cause the one or more processors to perform one or more device communication functions with the HART slave device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
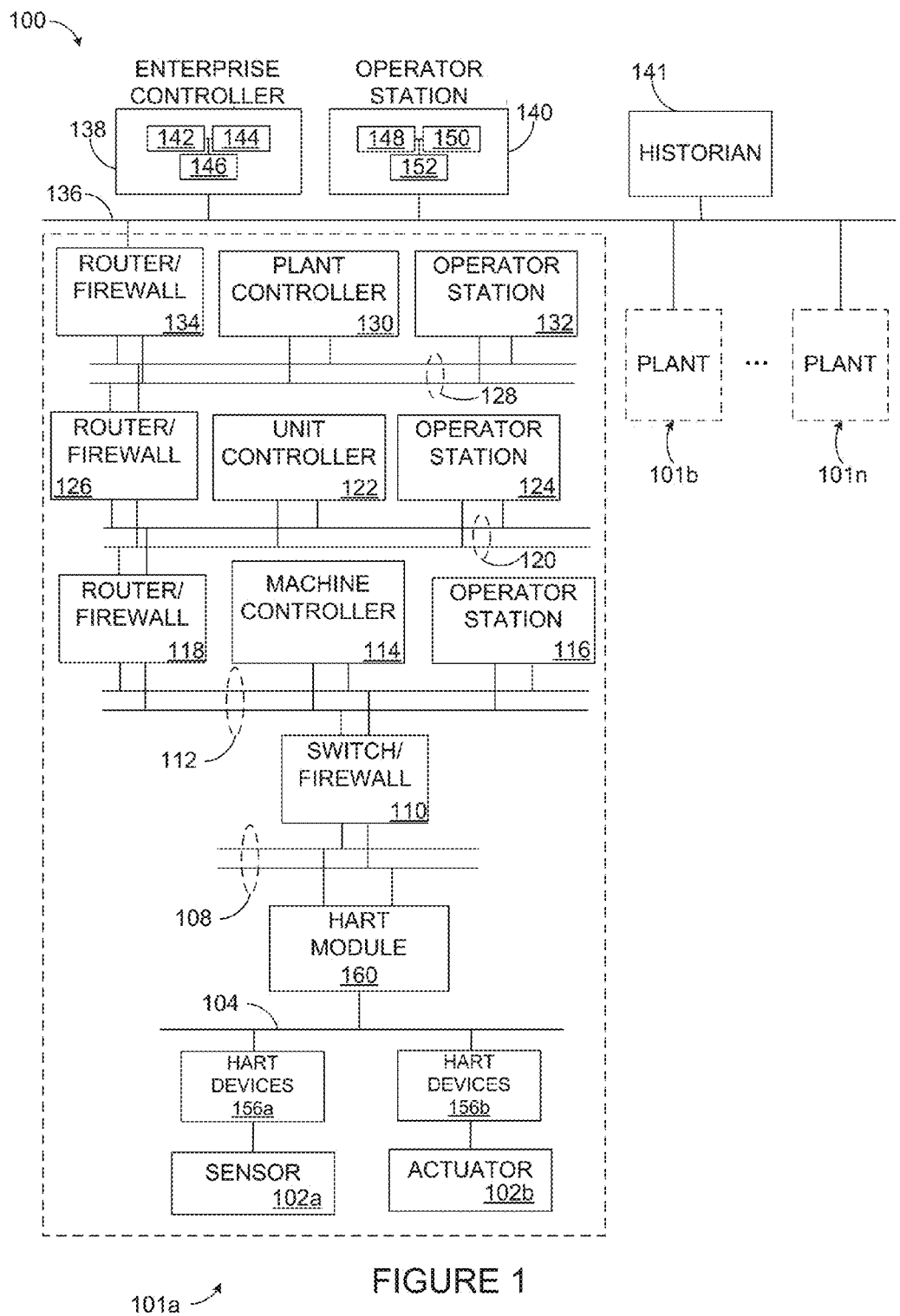
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more highway addressable remote transducer (HART) modules 160, which are coupled to the network 104. Among other things, each HART module 160 may use the measurements from one or more sensors 102a to control the operation of one or more actuators 102b. For example, a HART module 160 could receive measurement data from one or more sensors 102a via one or more HART devices 156a and use the measurement data to generate control signals for one or more actuators 102b via one or more HART devices 156b. Each HART module 160 includes any suitable structure for interacting with one or more sensors 102a and controlling one or more actuators 102b. Each HART module 160 could, for example, represent an IO module with a HART modem that sits on the PROFIBUS slave chassis. Each HART module 160 can either be a PROFIBUS slave device or a component of a PROFIBUS slave device.

Two networks 108 are coupled to the HART module 160. The networks 108 facilitate interaction with the HART module 160, such as by transporting data to and from the HART module 160. The networks 108 could represent any suitable networks or combination of networks. As a particular example, the networks 108 could represent a redundant pair of PROFIBUS networks.

In the Purdue model, "Level 2" may include one or more machine-level controllers 114 coupled to the networks 112. The machine-level controllers 114 perform various functions to support the operation and control of the HART module 160, sensors 102a, and actuators 102b, which could be associated with a particular piece of industrial equipment (such as a boiler or other machine). For example, the machine-level controllers 114 could log information collected or generated by the HART module 160, such as measurement data from the sensors 102a or control signals for the actuators 102b. The machine-level controllers 114 could also execute applications that control the operation of the HART module 160, thereby controlling the operation of the actuators 102b. In addition, the machine-level controllers 114 could provide secure access to the HART module 160. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more HART module 160, sensors 102a, and actuators 102b).

One or more operator stations 116 are coupled to the networks 112. The operator stations 116 represent computing or communication devices providing user access to the machine-level controllers 114, which could then provide user access to the HART module 160 (and possibly the sensors 102a and actuators 102b). As particular examples, the operator stations 116 could allow users to review the operational history of the sensors 102a and actuators 102b using information collected by the HART module 160 and/or the machine-level controllers 114. The operator stations 116 could also allow the users to adjust the operation of the sensors 102a, actuators 102b, HART module 160, or machine-level controllers 114. In addition, the operator stations 116 could receive and display warnings, alerts, or other messages or displays generated by the HART module 160 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system. It should be understood that the HART module 160 can be considered a gateway.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, HART module 160, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

In order to interpret digital data read via an acyclic command (such as a PROFIBUS DPV1 acyclic command), the machine controller 114 needs to understand the HART device description (DD) file from the vendor of the HART slave devices 156a and 156b. The machine controller 114 is configured to configure or associate the DD file to the particular HART slave device (such as 156a or 156b connected to a particular HART module 160). The configuration of the DD file by the HART module 160 can be performed using a function block in a control builder engineering tool, for example. In order for the machine controller 114 to configure the DD file of the HART device connected to the HART module 160, the machine controller 114 receives or accesses HART device information. HART device information includes at least one of a HART device type (such as an actuator, sensor, controller, or the like), manufacturer ID, or a DD file revision number. The machine controller 114 uses the HART device information to configure a DD file. The process of accessing or receiving HART device information to configure a DD file so that the machine controller 114 can understand DD files received from HART slave devices can be cumbersome when a multitude of HART devices are in communication with the HART module 160.

Embodiments of this disclosure provide a technique to solve these and other problems by detecting HART slave devices 156a and 156b that are connected, via a network (such as network 104), to the HART module 160 and presenting HART device information to a user. The HART module 160 receives HART device data of a specific HART slave device (such as a user data indicating a specific HART device 156a or 156b) to identify a correct or appropriate DD file for the specific HART slave device 156a or 156b. The HART device data of the specific HART device can be obtained from the physical HART device in the field, for example. In an embodiment, the HART device data of the specific HART device can be a manufacturer ID, a device revision, or the like. The HART profile index is taken from the PROFIBUS slave's GSD file and used by the machine controller 114 to establish a communication channel to the HART device via the HART module 160. The HART module 160 can receive the HART profile index via an Input-Output module function block of the HART module 160. The HART profile index can originate from a GSD file of the PROFIBUS slave to which the HART module 160 belongs.

In response to receiving the HART device input of the specific HART device, the machine controller 114 automatically chooses or identifies a correct or appropriate DD file to be associated with the HART slave devices 156a or 156b as well as a corresponding communication channel between the HART slave devices 156a or 156b and the HART module 160. Once the HART module 160 chooses or identifies a correct or appropriate DD file to be associated with the HART slave devices 156a or 156b, the machine controller 114 performs HART device communication functions with the HART devices 156a or 156b. HART device communication functions can include opening a device data port (DP (V1)) connection to the PROFIBUS slave, sending initialization DP (V1) write/retry/read commands, and the like. The HART device communication functions can be performed on all channels that can provide communication between the HART module 160 and the HART slave device 156a or 156b. After the machine controller 114 performs HART device communication functions based on the HART PROFIBUS slave module's HART profile information, the HART module 160 obtains profile information based on the HART command response from the HART slave device 156a or 156b. The HART command response, in the form of an integer array, includes a HART device manufacturer identification (ID), a HART device type (such as an actuator, thermometer, pressure sensor, controller, and the like), HART device revision number, and the like.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs.

Figure 2:
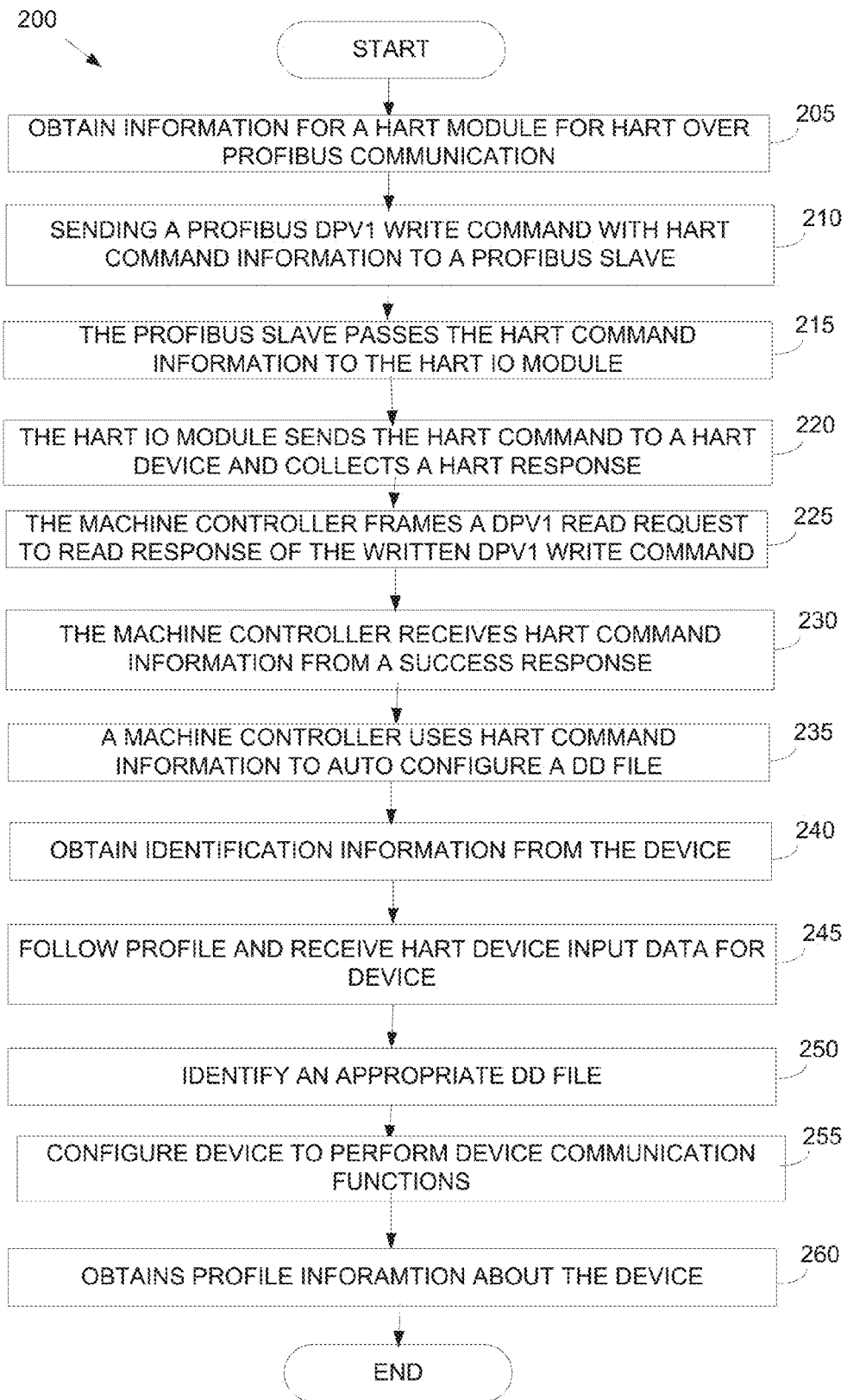
FIG. 2 illustrates an example method of auto-detecting a HART device over PROFIBUS according to this disclosure.

FIG. 2 illustrates an example method 200 of auto-detecting a HART device over PROFIBUS according to this disclosure. The example auto-detection method 200 can be implemented using any suitable devices and in any suitable systems. For ease of explanation, the example auto-detection method 200 is described with respect to the system 100 of FIG. 1.

As shown in FIG. 2, at step 205, a machine controller obtains, using a HART profile index, information from a GSD file of the PROFIBUS slave for HART Over PROFIBUS communication. At step 210, the machine controller sends, to a PROFIBUS slave, a PROFIBUS DPV1 write command with HART command information. At step 215, the PROFIBUS slave passes the HART command information to HART IO module. At step 220, the HART IO module sends the HART command to a HART device and collects a HART response from the HART device. At step 225, the machine controller frames a DPV1 read request to read the response of the previously written DPV1 write command. In an embodiment, if a busy response is received from a PROFIBUS slave, step 225 is repeated. At step 230, if a success response is received from the PROFIBUS slave for the DPV1 read request, the machine controller will receive HART command information from the success response. At step 235, the machine controller uses the HART command information to auto configure the DD file for the corresponding HART device.

At step 240, the HART module 160 obtains identification information from the HART slave device 165a or 165b. At step 245, the machine controller receives HART device data of a specific HART slave device (such as a user input indicating a specific HART slave device 156a or 156b) to identify a correct or appropriate DD file for the specific HART slave device 156. The HART device data of the specific slave HART device can be obtained from the physical HART device in the field, for example. In an embodiment, the HART device data of the specific HART slave device can be a manufacturer ID and a device type. The HART module 160 can receive the HART index via an Input-Output module function block of the HART module 160. The HART profile index can originate from a GSD file of the PROFIBUS slave which the HART module 160 is part of.

At step 250, in response to receiving the device input of the specific HART device, the machine controller 114 automatically chooses or identifies a correct or appropriate DD file to be associated with the HART slave device 156a or 156b as well as a corresponding communication channel between the HART slave device 156a or 156b and the HART module 160. At step 255, once the HART module 160 chooses or identifies a correct or appropriate DD file to be associated with the HART slave device 156a or 156b, the HART module 160 performs HART device communication functions with the HART slave device 156a or 156b. HART device communication functions can include opening a device data port (DP (V1)) connection to the HART device 156, sending initialization DP (V1) write/retry/read commands, and the like. The HART device communication functions can be performed on all channels that can provide communication between the HART module 160 and the HART slave device 156a or 156b.

Although FIG. 2 illustrates one example auto-detection method 200, various changes may be made to FIG. 2. For example, while shown as a series of steps, various steps shown in FIG. 2 could overlap, occur in parallel, occur in a different order, or occur multiple times. Moreover, some steps could be combined or removed and additional steps could be added according to particular needs.

Figure 3:
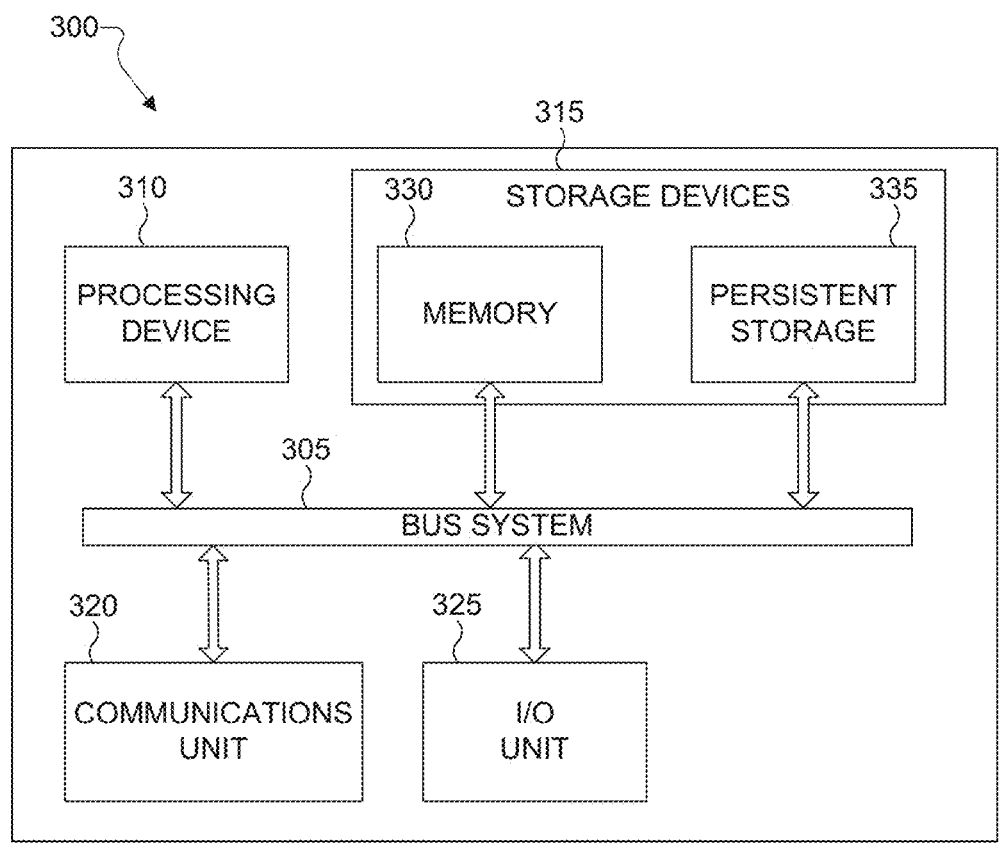
FIG. 3 illustrates an example electronic device according to this disclosure.

FIG. 3 illustrates an example electronic device 300 according to this disclosure. The electronic device 300 could, for example, represent a HART slave device 156a or 156b as well as a HART module 160, machine controller 114, or a PROFIBUS slave. As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 136. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

Although FIG. 3 illustrates one example of an electronic device 300, various changes may be made to FIG. 3. For example, electronic devices come in a wide variety of configurations. The electronic device 300 shown in FIG. 3 is meant to illustrate one example type of electronic device and does not limit this disclosure to a particular type of electronic device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. §112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
before a completion of a software configuration of one or more highway addressable remote transducer (HART) slave devices:
scanning the one or more HART slave devices connected to a PROFIBUS remote input/output (IO) slave device; and
collecting HART device data about a specified HART slave device of the one or more HART slave devices in order to choose a device description (DD) file configuration from a controller;
identifying a DD file associated with the specified HART slave device using the HART device data; and
performing one or more device communication functions with the specified HART slave device using the identified DD file.

2. The method of claim 1, further comprising:
obtaining identification information from the specified HART slave device before completing the software configuration of the one or more HART slave devices.

3. The method of claim 2, wherein the identification information of the specified HART slave device comprises at least one of:
a device manufacturer identification (ID);
a device type; and
a device revision number.

4. The method of claim 1, wherein the HART device data of the specified HART slave device comprises identification information that is automatically collected before completing the software configuration of the one or more HART slave devices.

5. The method of claim 4, wherein a machine controller automatically configures the DD file for the specified HART slave device based on the identification information.

6. The method of claim 1, further comprising:
establishing a communication channel with the specified HART slave device when identifying the DD file associated with the specified HART slave device.

7. The method of claim 1, wherein the one or more device communication functions comprise at least one of:
opening a device data port connection to the specified HART slave device, wherein the specified HART slave device is connected to the PROFIBUS remote IO slave device comprising HART inputs and outputs configured for HART data exchange; and
sending one or more initialization write/retry/read commands.

8. The method of claim 1, wherein the one or more device communication functions are performed on all channels that provide communication with the specified HART slave device.

9. A master device comprising:
processing circuitry configured to:
collect highway addressable remote transducer (HART) device data of a HART slave device via a PROFIBUS slave device;
identify a device description (DD) file associated with the HART slave device using the HART device data; and
perform one or more device communication functions with the HART slave device using the identified DD file.

10. The master device of claim 9, wherein the processing circuitry is further configured to obtain HART identification information for the HART slave device via the PROFIBUS slave device.

11. The master device of claim 10, wherein the identification information of the HART slave device comprises at least one of:
- a device manufacturer identification (ID);
- a device type; and
- a device revision number.

12. The master device of claim 9, wherein a machine controller is configured to automatically configure the DD file for the HART slave device.

13. The master device of claim 9, wherein the processing circuitry is further configured to identify a communication channel with the HART slave device when identifying the DD file associated with the HART slave device.

14. The master device of claim 9, wherein the one or more device communication functions comprise at least one of:
- opening a device data port connection to the PROFIBUS slave device; and
- sending one or more initialization write/retry/read commands.

15. The master device of claim 9, wherein the processing circuitry is configured to perform the one or more device communication functions on all channels that provide communication with the HART slave device.

16. A non-transitory, computer-readable medium storing one or more executable instructions that, when executed by one or more processors, cause the one or more processors to:
- receive highway addressable remote transducer (HART) device data of a HART slave device via a PROFIBUS slave device;
- identify a device description (DD) file associated with the HART slave device using the HART device data; and
- perform one or more device communication functions with the HART slave device using the identified DD file.

17. The non-transitory, computer-readable medium of claim 16, wherein the one or more executable instructions, when executed by the one or more processors, further cause the one or more processors to obtain identification information from the HART slave device before completing a software configuration of the HART slave device.

18. The non-transitory, computer-readable medium of claim 17, wherein the identification information of the HART slave device comprises at least one of:
- a device manufacturer identification (ID);
- a device type; and
- a device revision number.

19. The non-transitory, computer-readable medium of claim 16, wherein the one or more device communication functions comprise at least one of:
- opening a device data port connection to the HART slave device; and
- sending one or more initialization write/retry/read commands.

20. The non-transitory, computer-readable medium of claim 16, wherein the one or more executable instructions, when executed by the one or more processors, further cause the one or more processors to identify a communication channel with the HART slave device when identifying the DD file associated with the HART slave device.

* * * * *